US011327858B2

(12) United States Patent
Narasimhamurthy et al.

(10) Patent No.: US 11,327,858 B2
(45) Date of Patent: May 10, 2022

(54) PRESERVING DATA INTEGRITY DURING CONTROLLER FAILURE

(71) Applicant: Seagate Technology LLC, Fremont, CA (US)

(72) Inventors: Adithya Uligere Narasimhamurthy, Longmont, CO (US); Ritvik Viswanatha, Longmont, CO (US); Michael Barrell, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 46 days.

(21) Appl. No.: 16/990,994

(22) Filed: Aug. 11, 2020

(65) Prior Publication Data
US 2022/0050756 A1 Feb. 17, 2022

(51) Int. Cl.
G06F 11/20 (2006.01)
G06F 12/0806 (2016.01)

(52) U.S. Cl.
CPC ...... *G06F 11/2092* (2013.01); *G06F 11/2071* (2013.01); *G06F 12/0806* (2013.01); *G06F 2201/82* (2013.01); *G06F 2212/1032* (2013.01); *G06F 2212/222* (2013.01)

(58) Field of Classification Search
CPC ............. G06F 11/2092; G06F 11/2071; G06F 12/0806; G06F 2201/82; G06F 2212/1032; G06F 2212/222
See application file for complete search history.

(56) References Cited

U.S. PATENT DOCUMENTS

| | | | |
|---|---|---|---|
| 5,530,842 A | 6/1996 | Abraham et al. | |
| 5,613,068 A | 3/1997 | Gregg et al. | |
| 5,619,642 A | 4/1997 | Nielson et al. | |
| 5,680,579 A | 10/1997 | Young et al. | |
| 5,802,561 A | 9/1998 | Fava et al. | |
| 6,023,748 A | 2/2000 | Peters et al. | |
| 6,038,680 A | 3/2000 | Olarig | |
| 6,058,455 A | 5/2000 | Islam et al. | |
| 6,065,102 A | 5/2000 | Peters et al. | |
| 6,243,829 B1 | 6/2001 | Chan | |
| 6,247,099 B1 | 6/2001 | Skazinski et al. | |
| 6,279,119 B1 * | 8/2001 | Bissett | G06F 11/1633 703/23 |
| 6,353,878 B1 * | 3/2002 | Dunham | G06F 11/1456 707/999.009 |
| 6,490,659 B1 * | 12/2002 | McKean | G06F 12/0873 711/141 |
| 6,690,534 B2 | 2/2004 | Ding et al. | |
| 6,698,022 B1 | 2/2004 | Wu | |
| 6,732,243 B2 | 5/2004 | Busser et al. | |
| 6,766,491 B2 | 7/2004 | Busser | |

(Continued)

*Primary Examiner* — Matthew M Kim
*Assistant Examiner* — Indranil Chowdhury
(74) *Attorney, Agent, or Firm* — Kirk A. Cesari

(57) ABSTRACT

Systems and processes are disclosed to preserve data integrity during a storage controller failure. In some examples, a storage controller of an active-active controller configuration can back-up data and corresponding cache elements to allow a surviving controller to construct a correct state of a failed controller's write cache. To accomplish this, the systems and processes can implement a relative time stamp for the cache elements that allow the backed-up data to be merged on a block-by-block basis.

20 Claims, 7 Drawing Sheets

(56) References Cited

U.S. PATENT DOCUMENTS

| | | | |
|---|---|---|---|
| 6,874,100 B2 * | 3/2005 | Rauscher | G06F 11/2089 714/6.21 |
| 6,996,672 B2 | 2/2006 | Lubbers et al. | |
| 7,062,591 B2 | 6/2006 | Pecone | |
| 7,107,320 B2 | 9/2006 | Busser et al. | |
| 7,143,227 B2 | 11/2006 | Maine | |
| 7,149,819 B2 | 12/2006 | Pettey | |
| 7,246,256 B2 * | 7/2007 | De La Cruz | G06F 11/2025 714/4.11 |
| 7,315,911 B2 | 1/2008 | Davies et al. | |
| 7,328,324 B2 | 2/2008 | Wang et al. | |
| 7,340,555 B2 | 3/2008 | Ashmore et al. | |
| 7,366,843 B2 | 4/2008 | Cypher et al. | |
| 7,380,055 B2 | 5/2008 | Ashmore | |
| 7,380,115 B2 | 5/2008 | Maine | |
| 7,380,163 B2 | 5/2008 | Davies et al. | |
| 7,418,621 B2 | 8/2008 | Ashmore | |
| 7,444,541 B2 | 10/2008 | Lubbers et al. | |
| 7,480,815 B2 | 1/2009 | Rust et al. | |
| 7,536,495 B2 | 5/2009 | Ashmore et al. | |
| 7,536,508 B2 | 5/2009 | Davies | |
| 7,558,981 B2 * | 7/2009 | Ashmore | G06F 11/2066 711/113 |
| 7,627,780 B2 | 12/2009 | Davies | |
| 7,660,946 B2 * | 2/2010 | Watanabe | G06F 3/065 711/113 |
| 7,669,080 B2 * | 2/2010 | Lind | G06F 11/2097 714/11 |
| 7,681,089 B2 | 3/2010 | Ashmore | |
| 7,809,886 B2 | 10/2010 | Ashmore et al. | |
| 8,301,593 B2 | 10/2012 | Hoffmann et al. | |
| 8,356,126 B2 | 1/2013 | Ashmore | |
| 8,788,665 B2 | 7/2014 | Gilde et al. | |
| 8,868,504 B2 | 10/2014 | Aranha et al. | |
| 8,880,800 B2 | 11/2014 | Mathew et al. | |
| 9,037,793 B1 * | 5/2015 | O'Brien, III | G06F 3/0613 711/114 |
| 9,053,073 B1 * | 6/2015 | Subramanian | G06F 11/2082 |
| 9,684,598 B1 * | 6/2017 | Devor | G06F 12/0824 |
| 9,804,781 B2 | 10/2017 | Kowles | |
| 9,836,404 B2 * | 12/2017 | Ummadi | G06F 3/0619 |
| 10,303,365 B1 | 5/2019 | Wu et al. | |
| 2003/0217211 A1 | 11/2003 | Rust et al. | |
| 2004/0030837 A1 * | 2/2004 | Geiner | G06F 11/2064 711/133 |
| 2004/0236983 A1 * | 11/2004 | Burton | G06F 11/2082 714/6.23 |
| 2005/0010838 A1 * | 1/2005 | Davies | G06F 11/2007 714/100 |
| 2006/0010227 A1 * | 1/2006 | Atluri | H04L 67/1097 709/217 |
| 2006/0212644 A1 * | 9/2006 | Acton | G06F 11/2092 711/103 |
| 2010/0174676 A1 * | 7/2010 | Ash | G06F 11/1469 707/609 |
| 2013/0097367 A1 * | 4/2013 | Flynn | G06F 11/108 711/103 |
| 2014/0258608 A1 * | 9/2014 | Viswanatha | G06F 3/065 711/113 |
| 2014/0351534 A1 * | 11/2014 | Crawford | G06F 3/0614 711/162 |
| 2015/0012699 A1 | 1/2015 | Rizzo et al. | |
| 2016/0328303 A1 * | 11/2016 | Brandner | G06F 11/1662 |
| 2016/0350012 A1 * | 12/2016 | Tamma | G06F 3/0647 |
| 2016/0378625 A1 * | 12/2016 | Aizer | G06F 3/065 714/6.3 |
| 2019/0102264 A1 * | 4/2019 | Boden | G06F 11/2082 |

* cited by examiner

PRESERVING DATA INTEGRITY DURING CONTROLLER FAILURE

SUMMARY

In certain embodiments, a server computer system can include a first storage controller configured to connect to a backplane or midplane; a second storage controller configured to connect to the backplane or midplane; where the first storage controller and the second storage controller can be configured to operate in an active-active controller configuration where both controllers are actively available to support data write operations from a host. Further, the first controller can be configured to mirror first data corresponding to a first write operation intended for a second storage controller into a first memory, the mirrored first data including a first nonvolatile cache element corresponding to payload data of the first write operation, the first nonvolatile cache element including a first relative timestamp based on an order the second storage controller received the first write operation from a host. When the second storage controller fails, the first storage controller can be further configured to recreate a state of the second storage controller's write cache based on the first nonvolatile cache element and the first relative timestamp; merge the mirrored first data on a block-by-block basis with data corresponding to multiple write operations received by the second storage controller, which have overlapping first write locations, based on the first relative timestamp to produce a first new cache element that indicates selected data from more than one of the multiple write operations received by the second controller to be written to the first write locations; and write the data blocks identified in the first new cache element to the first write locations. Even further, the second controller can be configured to mirror second data corresponding to a second write operation intended for the first storage controller into a second memory, the mirrored second data including a second nonvolatile cache element corresponding to payload data of the second write operation, the second nonvolatile cache element including a second relative timestamp based on an order the first storage controller received the second write operation from a host. When the first storage controller fails, the second storage controller can be further configured to recreate a state of the first storage controller's write cache based on the second nonvolatile cache element and the second relative timestamp; merge the mirrored second data on a block-by-block basis with data corresponding to multiple write operations received by the first storage controller that have overlapping write locations based on the relative timestamp to produce a new cache element that indicates selected data from more than one of the multiple write operations to be written to the write locations; and write the data blocks identified in the new cache element to the write locations.

In certain embodiments, an apparatus can comprise a first storage controller subsystem configured to operate in an active-active controller configuration with a second storage controller subsystem and manage host data write operations, the first storage controller subsystem including: a first interface configured to connect to a backplane or midplane and configured to receive the host data write operations; a first memory; and a first memory controller. The first memory controller can be configured to mirror data corresponding to a host write operation intended for the second storage controller subsystem into the first memory, the mirrored data including a nonvolatile cache element (NVCE) corresponding to the data of the host write operation, the NVCE including a relative timestamp based on an order the second storage controller subsystem received the host write operation corresponding to the mirrored data. Further, when the second controller subsystem fails, the first storage controller subsystem can recreate a state of the second storage controller subsystem's write cache based on the NVCE and the relative timestamp; merge the mirrored data with data corresponding to other write operations received by the second controller that have overlapping write locations, perform the merge on a block-by-block basis based on the relative timestamp, produce a new cache element indicating the data to be written to the write locations as an output of the merge process; and write the data blocks corresponding to the new cache element to the write locations based on the new cache element.

In certain embodiments, a method can include operating a first storage controller subsystem in an active-active controller configuration with a second controller subsystem to manage host data write requests to a data storage array; performing, at the first storage controller subsystem, relative time stamp dating of data received from a host and stored in a write cache to maintain a logical write order while executing write operations; mirroring backup data, at the first storage controller subsystem, corresponding to host writes intended for the second controller subsystem into the write cache, the backup data including a cache element including information to allow the first storage controller subsystem to determine which data is newest on a block-by-block basis based on a relative time stamp of the cache element; determining a failure condition of the second controller subsystem; and when the failure condition is determined, reconstructing the second controller subsystem's write cache via the backup data by selecting the backup data on a block-by-block basis based on the relative time stamp of the cache element.

DETAILED DESCRIPTION

Figure 1:
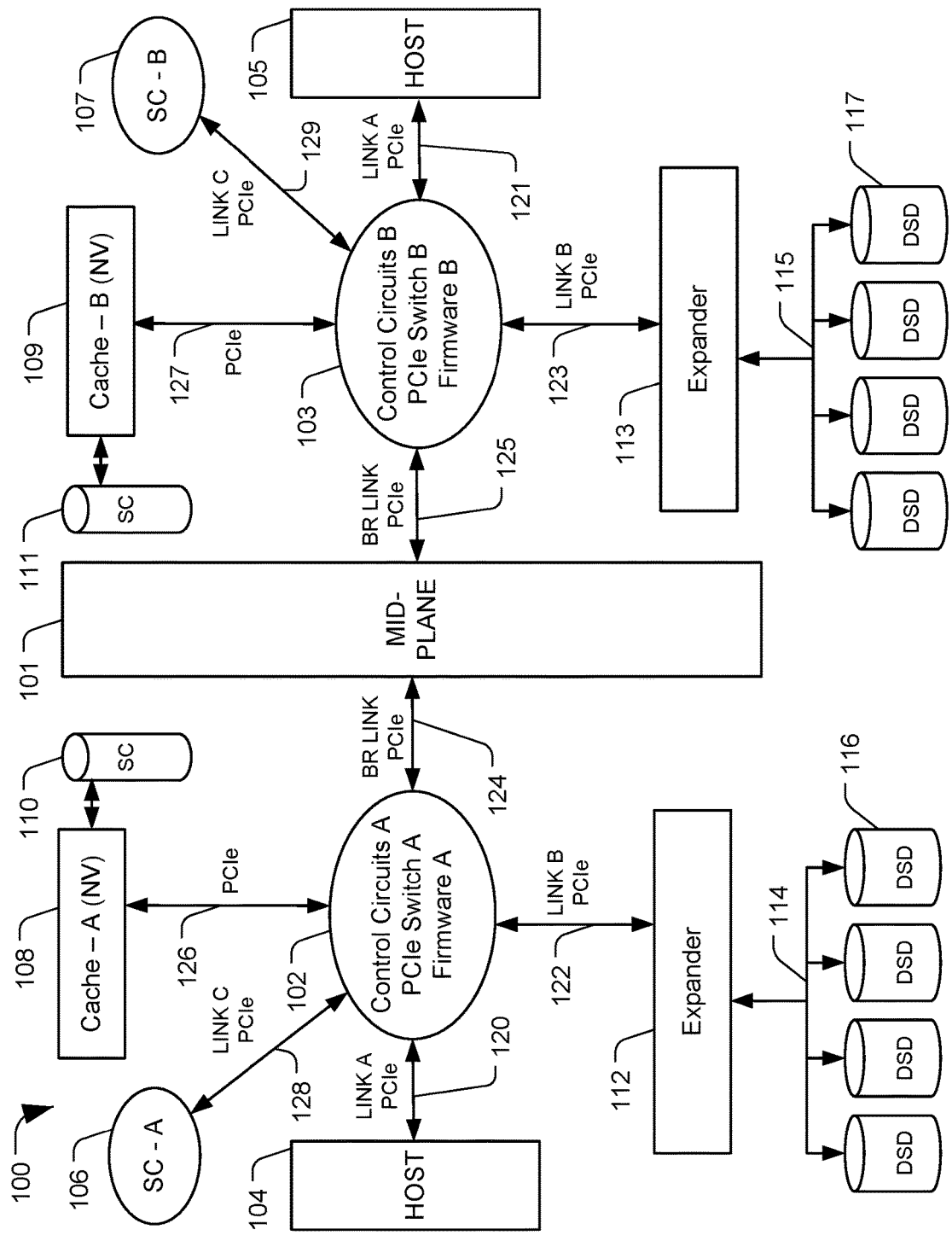
FIG. 1 is a diagram of a system for preserving data integrity during storage controller failure, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, computer(s), application specific integrated circuit(s) (ASIC(s)), programmable logic arrays, system-on-chip (SoC), server(s), and other hardware devices can likewise be constructed to implement the systems. circuits, functions, processes, and methods described herein. Processes, methods, and functions herein may be performed by modules, nodes, or engines, or a combination thereof, any of which may include one or more physical components of one or more computing device(s) (e.g., logic, circuits, processors, controllers, memory, etc.) configured to perform a particular task or job, or may include instructions that, when executed, can cause one or more processors to perform a particular task or job, or may be any combination thereof. Further, the processes described herein may be implemented as a computer readable storage medium or memory device including instructions that, when executed, cause a processor to perform the methods.

A storage controller electronically communicates with one or more host computing devices to provide the systems and processes for the storage and retrieval of data from persistent data storage. Some systems can include multiple storage controllers, such as in a dual active-active storage controller configuration that can provide added storage controller redundancy to maintain data integrity if one of the controllers fail. With the active-active storage controller approach, at least two controllers are actively available to support logical unit numbers (LUNs) and volumes while each of the storage controllers can have specific LUNs assigned to them for processing of data storage operations. If a controller fails, the surviving controller(s) can support the data storage operations for its and the failed controller's LUNs. To minimize data loss if one of the storage controller fails, data may be mirrored between the multiple storage controllers.

For an active-active storage controller configuration with data mirroring ability, at any given instant in time, duplicate data can exist in a data cache for a given set of blocks that are involved in a host write. The duplicate data may need to be merged before being stored to long term nonvolatile storage (e.g. a final nonvolatile storage destination mapped to LBAs associated with a write operation, sometimes referred to as persistent media or persistent storage), such as RAID (Redundant Array of Inexpensive Discs). If the storage controller that is performing the write fails before the merge completes, all the information related to the write may be lost. With the systems and processes disclosed herein, the surviving controller can reconstruct the cache of the failed controller, merge the cached data in the correct order with the limited knowledge of the write information, and write the correct host data to the long term storage thus preserving data integrity.

The systems and methods herein can preserve data integrity during controller failures by relative time ordering of user data and merging the user data on a surviving controller. While the examples provided herein are discussed with reference to a dual active-active controller system, the systems and processes disclosed herein can also be applied to a system with more than two controllers. Thus, the systems and processes herein are scalable to various multiple controller configurations. For example, the systems and processes described herein can also be applied to active-passive controller configurations, provided the controller that is passive receives the data (e.g., via mirroring or some other mechanism) and then uses the processes described herein to detect and merge the duplicate data. Also note that the processes described herein can also be applied in a single controller scenario too.

FIG. 1 shows a diagram of a system for preserving data integrity during controller failure, generally designated 100, in accordance with certain embodiments of the present disclosure. System 100 may be a server computer system utilized to perform the methods, processes, and functions described herein. System 100 can include storage controllers 102 and 103 that can communicate with hosts 104 and 105 via communication links 120 and 121; storage controllers 102 and 103 may each also be referred to as a storage controller subsystem. The system 100 can also include memory caches 108 and 109, which may be coupled to capacitors (SC) 110 or 111, which can provide power for at least a portion of the caches 108 or 109 to be nonvolatile while the capacitors 110 or 111 contain enough power, which may also include a combination of circuit(s) or module(s) configured to implement a capacitor based cache backup routine upon detection of a power event or similar. The caches 108 and 109 may be coupled to the storage controllers 102 or 103 via a communication link 126 or 127, which in some examples may be PCIe (Peripheral Component Interconnect Express) buses.

In some embodiments, additional storage controllers 106 and 107 (which may sometimes be referred to as a memory controller(s) to provide some distinction from the storage controller subsystem(s)) may each be separate controllers from storage controllers 102 and 103, and may be communicatively coupled to the storage controllers 102 or 103 via a communication links 128 or 129, which in some examples may be PCIe links. The capacitor control circuits 106 or 107 can include separate firmware that is executable to perform the functions, operations, and processes described herein.

Storage controllers 106 and 107 may each be coupled to a mid-plane or back-plane system 101 via communication links 124 or 125, which can be a backbone to allow multiple storage controllers and devices to be physically coupled via a computer bus, and in some examples may be a PCIe mid-plane that includes PCIe bridge links. Storage controllers 106 and 107 may each be coupled to expanders 112 or 113 via communication links 122 or 123, which may be physical interface PCIe links through the midplane/backplane. In some embodiments, the physical interface connections that can be utilized are: 1) a PCIe broadcast link that can be used to transfer data between the controllers; and 2) a hardware communication link that connects complex programmable logic device(s)(CPLD(s)) on each controller board, which can allow the controller firmware to set CPLD register states to allow heartbeat signal exchange between the partner controllers and allow resetting the partner controller. A CPLD can include a combination of a fully programmable logic array and a bank of macrocells. The logic array can be reprogrammable and can perform a multitude of logic functions. Macrocells are functional blocks that perform combinatorial or sequential logic, and also have the added flexibility for true or complement, along with varied feedback paths. Expanders 112 and 113 may be coupled to an array of nonvolatile data storage devices 116 or 117 via data buses 114 or 115, which may be disc based data storage devices, solid state data storage devices, a combination thereof, or any other type of nonvolatile memory device.

For a storage controller, such as storage controller 106 or 107, to efficiently write the data on to the data storage devices, such as data storage devices 116 or 117, the storage controller can engage all the data storage devices for a given raid configuration. The firmware of the storage controller can achieve this by performing striped writes. An example of a striped write is a full stripe write (FSW) that involves writing the cached data in sequential order where every drive gets a constant chunk of the data where the chunk size is constant (e.g., 1024 blocks of data). Full stripe writes can be desirable for various reasons, however, because of the randomness of the host writes, a full stripe write cannot be performed every time. Another example of a striped write is an efficient Partial Stripe Write (ePSW) where the firmware can read missing blocks from the data storage devices to fill in blocks of data in the cached data that was not more recently received from a host for a given stripe, thus, building a full stripe in the cache that can then be written out to the data storage devices. This can provide a better write performance compared to writing a partially filled stripe.

The storage controllers 106 and 107 can be equipped with the additional data ram 108 and 109, respectively, to hold the host data, which is intended to be written out to persistent data storage 116 or 117 at a later time. Thus, this memory region can act as a storage controller cache to provide faster access to write host data. The storage controller can also have a mirroring capability to mirror any data that is written into this memory region to the corresponding cache on the partner storage controller. Further, this region can be backed up during a storage controller fail (e.g. power failure) and can be used to reconstruct its cache memory after rebooting from a failure. In some examples, a mirroring capability can be performed by configuring selected memory ranges to be mirrored by the hardware (e.g., Control Circuits A/B 106/107 in this case using Firmware A/B) such that anytime a particular cache range is accessed on one controller for a write operation, the hardware automatically writes/mirrors the same data into a memory of the partner controller for holding duplicate data of the same address range.

During operation, system 100 may service a host write operation via a lockless write cache (LWC) process, which may be performed by storage controller 106 or 107 via executing the firmware stored therein, respectively. A write operation can consist of metadata and a payload storing the host data intended to be stored to a persistent data storage; the host data may be of a specific size (or amount) and can be organized into segments, which may be referred to as blocks. For example, a write operation may include 64 blocks of host data in a payload, where each block of data contains 4 KB of data, thus the whole data payload of the write operation in this example includes 256 KB of data. When a write operation is received, the firmware may execute different stages of the operation before it is completed. Example stages that may be executed can include an allocate memory stage, transfer data stage, a backup validation stage, a notification stage, a merge data stage, a duplicate invalidation stage, a completion stage, other stages, or a combination thereof. Further detailed examples are provided below.

In an allocate memory stage, the firmware may allocate the cache memory 108 or 109 needed for the write by allocating and populating the information for one or more cache element(s) (CE) corresponding to the write operation. The corresponding nonvolatile cache element(s) (NVCE) may also be created and populated at this time in a memory space that is nonvolatile, such as a portion of the cache 108 or 109 that is nonvolatile due to being protected by a capacitor.

A cache element (CE) can be a data structure that can contain various pieces of information to describe a data buffer containing a specific number of blocks of user data (e.g., 64 blocks of user data). A CE can be constructed in the CPU memory (e.g. the CPU 280 or 281 of data controller 204 or 205) and can contain various data fields, such as bitmasks (e.g., dirty bit mask, valid bit mask, lock bit, etc.) or address fields, indicating a location or state of the cache element that is involved in a specific read or write operation. A read or write operation can be made up of one or more CEs, indicating the cache region (via logical addressing such as an LBA range) that is being used. In some embodiments, the CEs are not persistent and will be lost if the storage controller fails (e.g., loses power).

A NVCE can be a data structure that is a backed up version of a specific CE. A NVCE can contain a subset of data fields that are present in the corresponding CE. In some embodiments, the CEs and NVCEs share a one to one mapping and are used to reconstruct the cache state when a storage controller boots up or when a surviving storage controller takes over a partner storage controller's cache in the event of failure.

Figure 3:
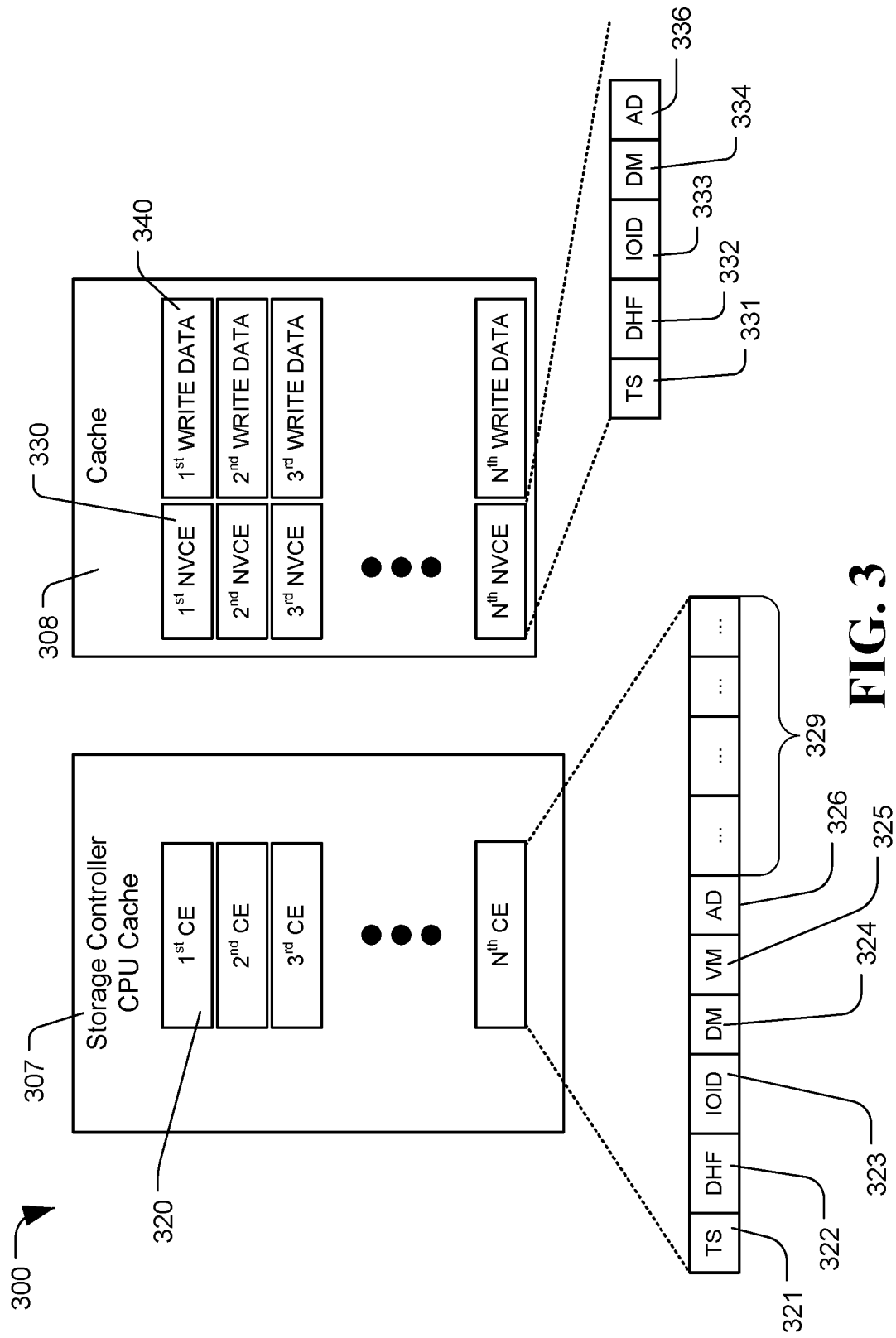
FIG. 3 is a diagram of a system for preserving data integrity during storage controller failure, in accordance with certain embodiments of the present disclosure.

Examples of data fields that can be included in a CE, a NVCE, or both are described herein; specifically, FIG. 3 and the description thereof provides examples of such data fields. For example, CEs can be constructed on the storage controller's CPU cache 106, while the NVCEs can be stored in memory cache 108. Thus, the system 100 can use the backed up NVCEs to build CEs on the storage controller's CPU cache 106 for faster access and lookup.

In a transfer data stage, the firmware may transfer the data received from the host, which may have been previously stored in a volatile cache of the controller 106 or 107 via an interface coupled to the host 104 or 105, to the allocated cache memory 108 or 109. At this stage, the firmware may also mirror the host data to the partner controller 106 or 107. The firmware may update the dirty and valid masks of the CEs to indicate they have dirty and valid data in them while updating the time stamp within each updated CE to the current time. The firmware may also include a backup validation stage for the NVCEs where the corresponding NVCEs are updated with the current information as the CE, such as the same dirty mask and time stamps.

In a notification stage, the firmware may initiate the sending of a notification to the host 104 or 105 that the write transaction is complete once the backup NVCE has been validated. The notification can indicate to the host 104 or 105 that it can initiate another write transaction to the same blocks if needed. Duplicate data and duplicate CEs can be created in the memory cache 108 or 109 when the host initiates overlapped writes (e.g., write operations cached to be executed having overlapping logical block addresses).

In a merge data stage, the firmware may inspect CEs to determine duplicate data and merge them accordingly since there can be multiple versions of user data that can exist before the data is stored to the data storage devices 116 or 117. In some examples, the data merge stage can be performed by having the controller 106 or 107 inspect two or more different CEs for the same LBA block range and identify any overlaps of the LBA range that need to be resolved. In further embodiments, the firmware may identify any gaps that needed to be filled, which can then be filled via an ePSW process. The overlaps and gaps, if applicable, can then be merged into a merged CE, which is then marked as dirty and valid.

In a duplicate invalidation stage, the firmware may mark any duplicate CEs as not valid and clean, since the blocks that were dirty had already been merged into the new merged CE in the previous stage. Corresponding NVCEs on the partner controller 106 or 107 can also be marked as not valid and clean at this stage.

In a completion stage, the firmware may deallocate resources that were allocated for the write operation, which can then indicate the completion of the write operation.

The LWC mode of operation of the controller 106 or 107 can create a window during the merge data stage and the duplicate invalidation stage, in which if the controller servicing the write operation fails, there can be duplicate CEs that are still marked as dirty. This creates a problem on the surviving controller to resolve the duplicates in the exact order as the host had written them and to merge them as needed to preserve the data integrity. Thus, to solve for this problem and other problems, a surviving storage controller can execute the data integrity processes described herein, such as the processes 500, 600, or 700.

Figure 2:
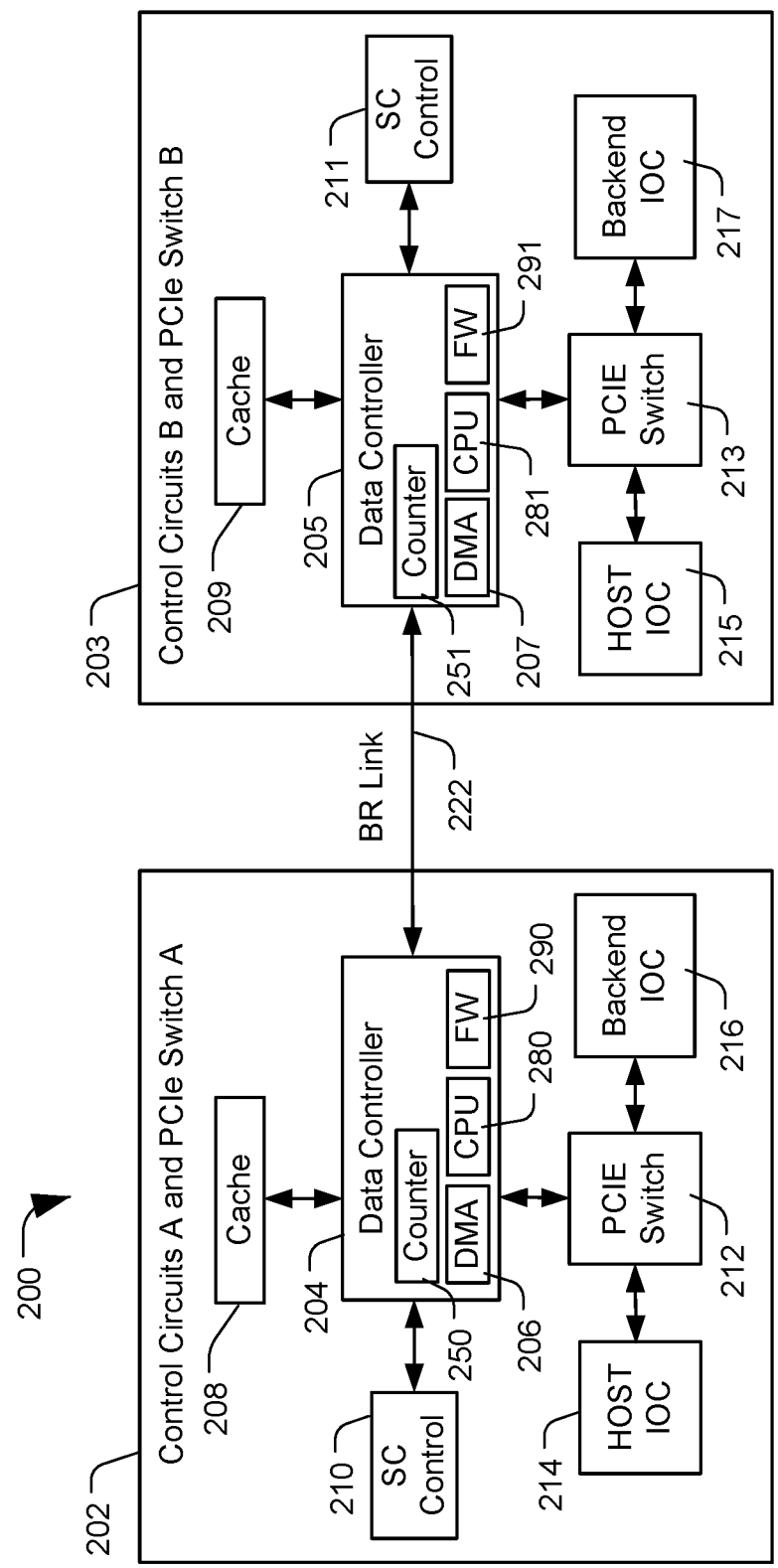
FIG. 2 is a diagram of a system for preserving data integrity during storage controller failure, in accordance with certain embodiments of the present disclosure.

FIG. 2 shows a diagram of a system for preserving data integrity during controller failure, generally designated 200, in accordance with certain embodiments of the present disclosure. System 200 is an example implementation of circuits 106 and 107 that may be utilized to perform the methods, processes, and functions described herein. System 200 can include storage controllers 202 and 203, which may each include a data controller circuit 204 or 205 and a PCIe switch 212 or 213. The storage controllers 202 and 203 can also each include a central processing unit (CPU) 280 or 281, which may be within the storage controller 204 or 205 or a processing unit distinct from a controller circuit, a cache 208 or 209, a capacitor control circuit 210 or 211, a host interface control circuit 214 or 215, and a data storage interface control circuit 216 or 217. Caches 208 and 209 can be volatile random access memory (RAM), which can be separate from the RAM of caches 108 and 109. Note that neither the memory of caches 108 and 109 nor the memory of caches 208 and 209 are required to be nonvolatile memory; the processes herein can be applied to reconstruct data whether such memory is volatile memory or nonvolatile memory. The data controller circuits 204 and 205 may each include memory storing executable firmware 290 or 291, a direct memory access (DMA) control circuit 206 or 207, and a counter 250 or 251. The data controller circuits 204 and 205 may be communicatively coupled via a communication bus 222, such as a PCIe bridge link.

During operation, system 200 may utilize the data controller 204 or 205, via the CPU 280 or 281, the DMA control circuit 206 or 207, the counter 250 or 251, and the firmware 290 or 291, to perform the processes, methods, and functions described herein. The host interface control circuit 214 or 215 may be utilized to receive and send operations from and to a host device, thus providing input and output control (IOC) of data between the storage controller 202 or 203 and a host. The data storage interface control circuit 216 or 217 may be utilized to receive and send operations from and to persistent data storage, such as an array of nonvolatile data storage devices, thus providing input and output control (IOC) of data between the storage controller 202 or 203 and persistent data storage.

The controller 204 or 205 can be configured to utilize the counter 250 or 251 to provide a relative time stamp for received operations. The counter 250 or 251 may be hardware, software, or a combination thereof. For example, the counter may be a counter circuit that increments a number relative to a system clock and stores the incremented value in a memory space, where the memory space can be accessed and copied when an operation needs a relative time stamp. The counter 250 or 251 can also include a reset function that allows control of the counter to be set to a specific value or reset to an initial value.

The PCIe switch 212 or 213 can be utilized to provide a managed data bus between the data controller 204 or 205 and peripheral devices, such as a large number of nonvolatile data storage devices (e.g. data storage arrays 116 and 117). PCIe utilizes a packet based communications protocol controlling traffic through each switch and provides numerous features such as quality of service (QoS), hot plugging, interrupt handling, and error handling services, as well as other features. Packets of data can be routed through switches based upon memory address, input output (I/O) address, device ID or by implicit transactions.

The communication bus 222, which may be a PCIe bridge link, may allow for direct communication of data (e.g., metadata, host data, CE updates, NVCE updates, etc.) between storage controllers 202 and 203. System 200 may utilize the communication bus 222 to transmit the information necessary to allow the backup of data, such as NVCEs or host data, between the storage controllers 202 and 203. For example, the storage controller 202 may transmit an update of a NVCE to the storage controller 203, and vice versa, such that each storage controller has a backup of the other storage controllers NVCEs.

In some embodiments, a controller to controller data backup can happen in various steps. In a first step, the data coming in from the host can be automatically mirrored over to the partner controller's cache by the hardware. The firmware can program the hardware with the cache memory address ranges that need to be mirrored over this way. In a second step, the NVCE updates can be mirrored over by the storage controller firmware as part of the "Invalidation of the CEs", "Validating the NVCEs", "Merge the user data" and "Invalidation of duplicates" steps described above. For example, the storage controller firmware can program the hardware DMA engines 206/207 in the data controller 204/205 to transfer the NVCE data at the NVCE addresses in cache memory to the partner controller. In a third step, the host data in the merged CE in the "Merge the user data" step described above can be mirrored over to the partner controller's cache the same way that NVCE updates are mirrored over.

FIG. 3 shows a diagram of a system for preserving data integrity during controller failure, generally designated 300, in accordance with certain embodiments of the present disclosure. System 300 is an example implementation of circuits and data structures that can be utilized within systems 100 or 200, and may be utilized to perform the methods, processes, and functions described herein. System 300 can include a storage controller CPU cache 307 (such as can be found within separate storage controllers 106 or 107) configured to store a CE, such as CE 320, and memory cache 308 (such as cache 108 or 109) configured to store a NVCE and data, such as NVCE 330 and write data 340.

In the storage controller firmware, the different data structures (e.g., CEs and NVCEs) can be used to store, track, and manipulate data that is received from a host (sometimes referred to as host data). The CE can describe a data buffer containing a specific number of blocks of host data (e.g. 64 blocks). They can be constructed in a CPU's memory and contain various bitmasks (dirty, valid, locked, etc.) indicating a state of an associated cache element that is involved in a read or write operation from a host. A read or write operation can be made up of one or more CEs, which may indicate the cache region that is being used. In some examples, a system can have a memory cache divided into read and write regions and only the write region is backed up or nonvolatile. In some embodiments, the CEs are not persistent (e.g., stored in a volatile memory) and will be lost if the controller fails.

A NVCE can be a backed up version of a specific cache element (e.g., NVCE 330 is a backed up version of CE 320, both corresponding with data buffer 340 storing host data). The NVCE can contain a subset less than all of the data fields that are present in a CE. In some embodiments, the CEs and NVCEs share a one to one mapping of specific data fields that can be used to reconstruct the cache state when a controller boots up or when a surviving controller takes over a partner's cache in the event of failure.

An example CE is shown with multiple fields where a subset (e.g., fields 321 to 325) are backed up to the corresponding NVCE, and other fields (e.g., fields 329) are not backed up to the corresponding NVCE. One or more fields of each CE and NVCE may be updated during I/O operations. In some embodiments, the fields in a CE that are backed up to a corresponding NVCE can include a time stamp field, a data hardened flag field, an I/O identification field, a dirty mask field, or a combination thereof. Other embodiments may include more or less of the fields within the CEs.

A time stamp (TS) field 321 and 331 can indicate the time when the corresponding NVCE was updated. In some embodiments, an update to the corresponding NVCE can happen at the time of data transfer from the host or a data merge, in which case, the data pointed to by two CEs are merged into a single destination CE. In all cases, the time stamp of the NVCEs are updated to maintain relative time ordering, which is used to preserve the order in which the host(s) intended to write data to the persistent storage volumes (e.g., the order in which the write operations were received by the storage controller 106 or 107 from the host 104 or 105). Thus, the time stamp field can indicate when a NVCE was last updated in response to a data transfer from a host or a data merge operation from another CE.

A data hardened flag (DHF) field 322 and 332 can indicate when the data storage controller has completely received the data from the host and the CEs that are involved in the writes have been marked as dirty.

An Input-Output Identifier (IOID) field 323 and 333 can identify a specific host write operation that a CE is associated with. In some embodiments, this number is unique for a given I/O operation. The IOID can be unique in the sense that, all the CEs in that IO operation have the same IOID and that unique IOID can be used to identify the IO operation within the system due to its uniqueness. Also, there can be many CEs that are involved in a single I/O operation and share a common IOID.

A Dirty Mask (DM) field 324 and 334 can be a bit mask to indicate if the CE or NVCE is dirty (e.g., a 64-bit dirty mask for a 64-block host data). A CE or NVCE is marked as dirty when it contains user data that is not yet written to the persistent data storage volumes. Once the data is written out to the persistent data storage volumes, these bits are cleared to indicate that the CE and NVCE is clean.

A Valid Mask (VM) field 325 can be a bit mask used to indicate the blocks that contain valid data; for example, a 64-bit valid mask for a 64-block host data. The VM field 325 can exist in the CE to allow for cache hits for reads for data that has already been written out to the persistent storage (e.g., DSDs 116 or 117). While a valid mask field could be implemented in a NVCE, such is not necessary with processes and operations described herein.

An address (AD) field 326 and 336 can include an indicator of an intended write location, such as an LBA range. For example, an LBA range may be indicated by bits identifying a start LBA and an end LBA to define a range.

During operation, the fields in the NVCE(s) can be used to reconstruct the correct state of a partner cache on the surviving controller when the failed controller has not completed the steps required to preserve data integrity. Examples of how such fields can be used are described herein.

Figure 4:
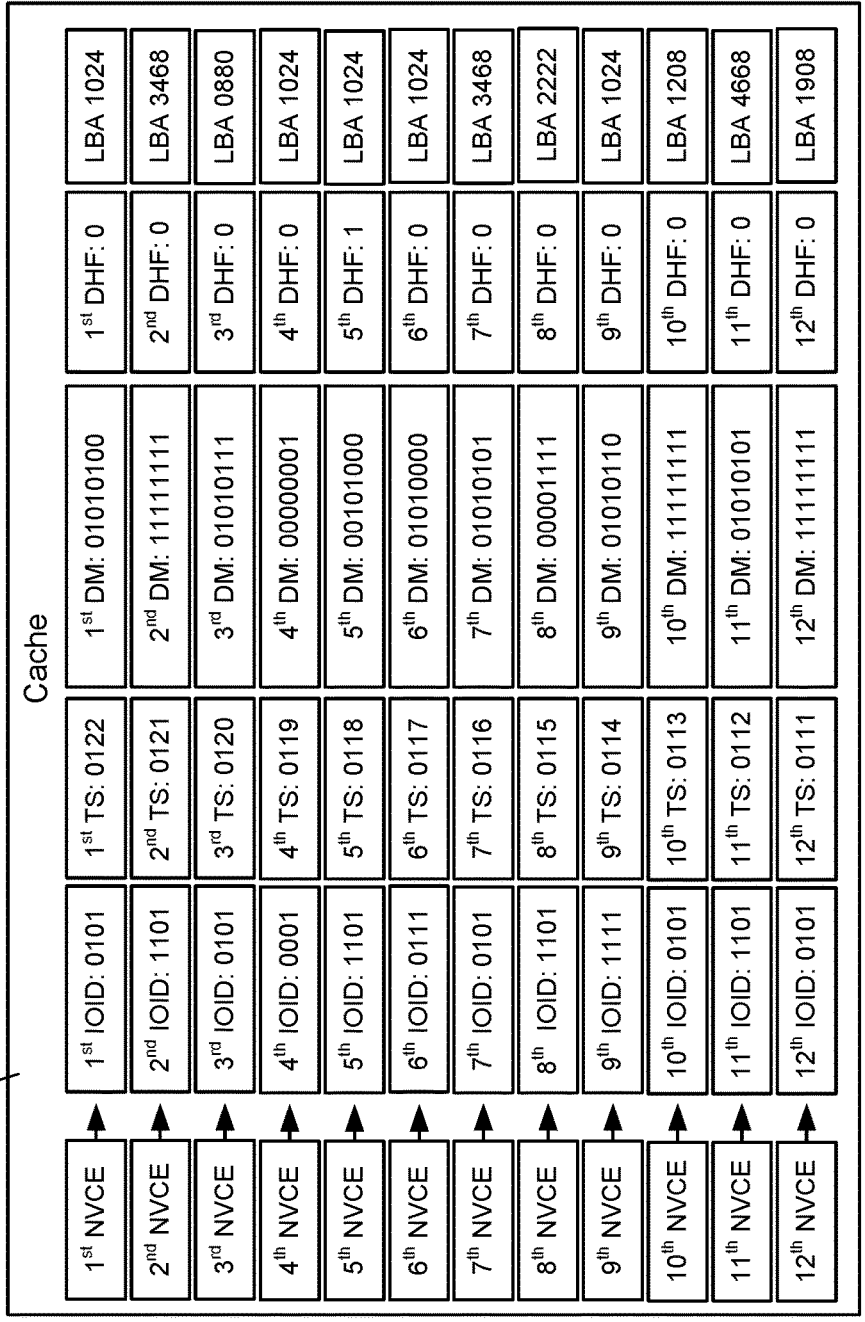
FIG. 4 is a diagram of a system for preserving data integrity during storage controller failure, in accordance with certain embodiments of the present disclosure.

FIG. 4 shows a diagram of a system for preserving data integrity during controller failure, generally designated 400, in accordance with certain embodiments of the present disclosure. System 400 is an example implementation of circuits and data structures that can be utilized within systems 100, 200, or 300, and may be utilized to perform the methods, processes, and functions described herein. System 400 can include a cache 408 configured to store NVCEs. As discussed herein, NVCEs can be used to construct a state of a failed controller's cache in a dual controller active-active storage system. The example cache contents shown are a few simplified examples of the data structures described herein that can be utilized by the processes, methods, and functions described herein. The sizes and data given as examples in the fields of FIG. 4 and discussed herein are used for illustrative purposes only and do reflect any data limitations or requirements of the NVCEs. Utilization of the example data structures by the processes disclosed herein are discussed further below.

Figure 5:
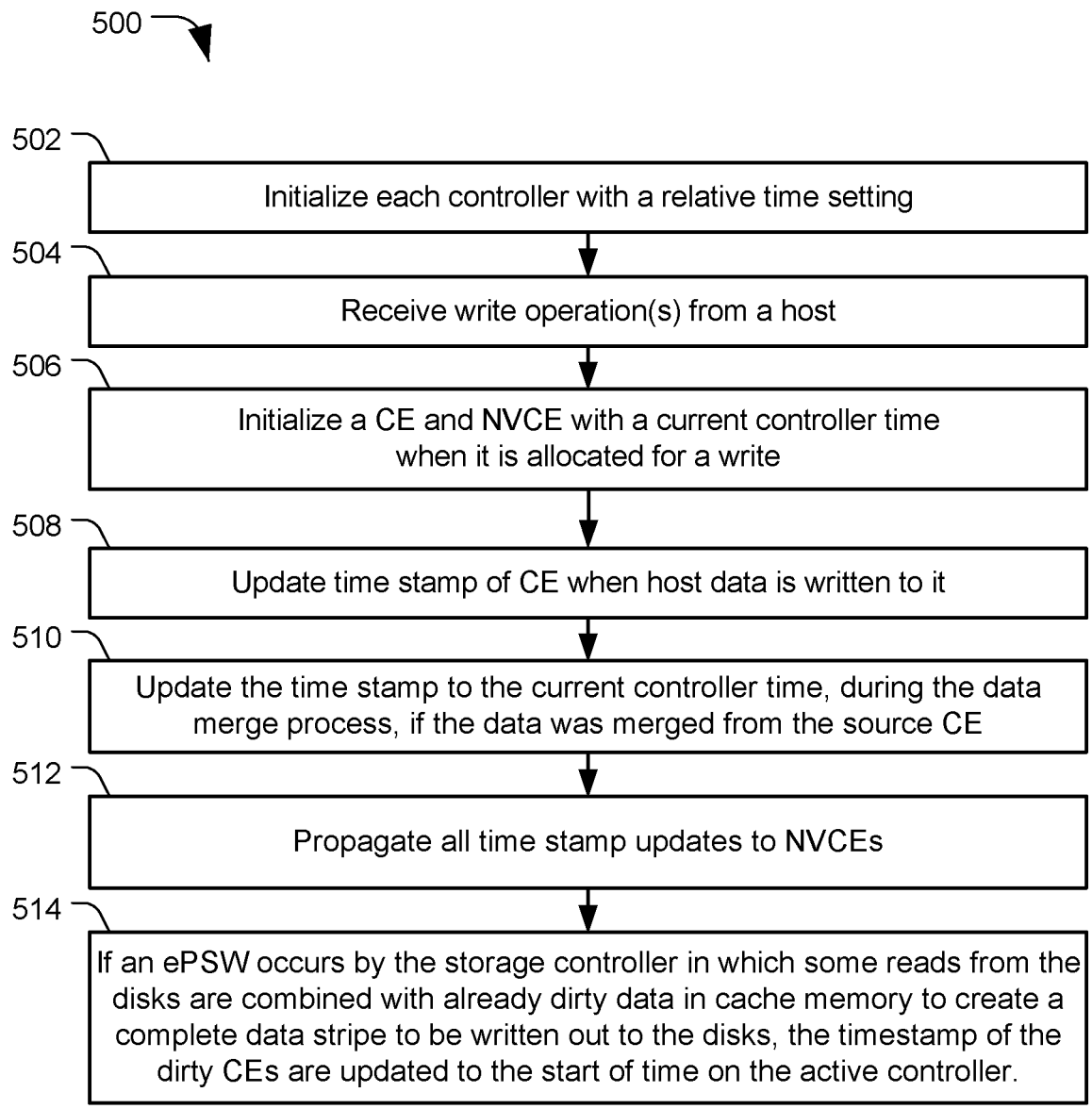
FIG. 5 is a flowchart of a process for preserving data integrity during storage controller failure, in accordance with certain embodiments of the present disclosure.

FIG. 5 shows a flowchart of a process for preserving data integrity during storage controller failure, generally designated 500, in accordance with certain embodiments of the present disclosure. The process 500 can be performed by the hardware described herein, such as systems 100, 200, 300, or 400, and can be used in conjunction with the other processes described herein, such as process 600 or 700. The process 500 can be implemented via firmware on a storage controller.

The process 500 can include initializing each storage controller with a relative time setting, at 502. This can allow each storage controller in an active-active storage controller system, such as systems 100 or 200, to create relative time stamps within the specific storage controller to be associated with received operations or data to maintain a logical execution order of the operations received from the host(s). The initialization of the time stamps can occur upon a system reset, per a command from a host, a detection of an error in the time stamps, or due to another trigger.

When a write operation is received from a host, at 504, the process 500 can allocate one or more CE, and corresponding NVCE(s), both corresponding to the operation and can initialize the one or more CE, and corresponding NVCE(s), with a current storage controller time, at 506. If a host send data for a write operation associated with an allocated CE, the storage controller can update the time stamp of the CE when the host data is written to it, at 508.

The process 500 can also include updating a CE's time stamp to the current storage controller time during a data merge process, if the data was merged from a source CE, at 510. In some embodiments, the value that a merged CE's timestamp is updated to can depend on the order that the "Notify to host" and "Merge the user data" steps are done during the host write process. If "Merge the user data" is done before "Notify to host", then the merged CE's timestamp can just be updated to the current storage controller time to maintain data integrity. If "Notify to host" is done before "Merge the user data", then the merged CE's timestamp can be updated to source CE's timestamp plus one to maintain data integrity. This increment by one can ensure no other CE(s) is likely to have the same timestamp as the one being updated since its small enough to preserve the atomicity of the timestamp and large enough to preserve the uniqueness of the timestamp. Examples and details of data merge processes are provided below.

The relative time stamp updates preserve the logical ordering time line in which the host(s) wrote the data by keeping the merged CE as the newest CE that contains the latest user data that was written by the host. The logical time stamp adjustment performed on the merged CEs are also propagated to the corresponding NVCEs, which can include both the NVCEs at the source controller and the partner controller, at 512.

In situations that involve an ePSW by the storage controller, in which some reads from the persistent data storage devices are combined with the already dirty data in cache memory to create a complete data stripe to be written out to the persistent data storage devices, the timestamp of the newly read dirty CEs, which were earlier clean, can be updated to the start of time on the storage controller, at 514, such as the time when the storage controller booted up. This can ensure that any CEs that are read from the persistent data storage devices and are marked as dirty contain a logical timestamp that is lesser than a duplicate CE that is involved in a subsequent host write, thus making the duplicate CE the newer CE and preserving the logical time order of the host writes. In such an implementation, the timestamp of the fully clean CEs read from disks are updated to the start of time on the storage controller. The timestamp of the CEs with already dirty cache data (can be partially or fully dirty) remains unchanged from earlier.

Thus, performing logical time stamp updates, such as via process 500, can preserve the time order of the write operations performed from a host perspective. By setting up the CE and NVCEs in this way, an active-active storage controller system can address the problems of storage controller failure that can occur before performing the invalidation of duplicate CE and NVCEs.

Figure 6:
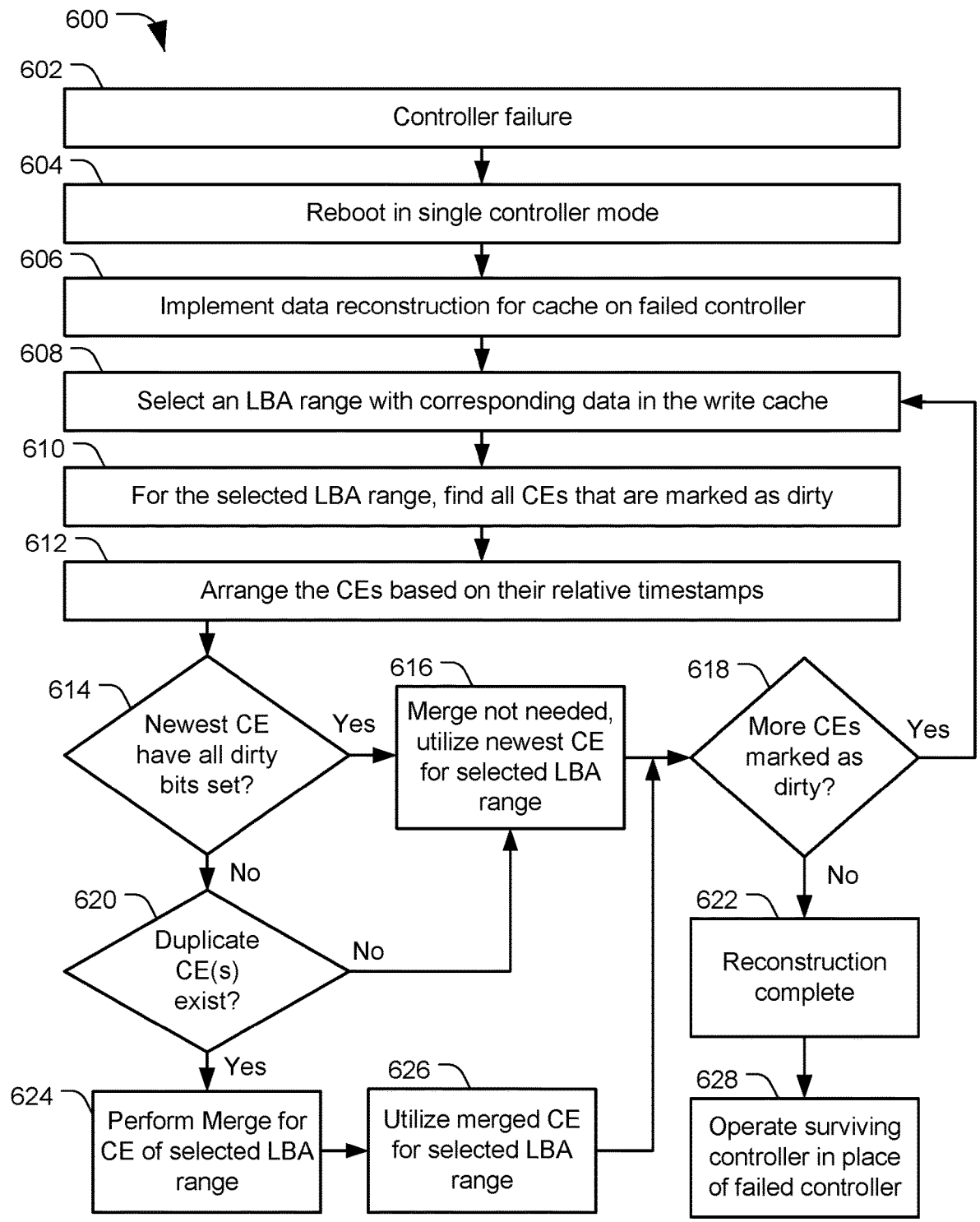
FIG. 6 is a flowchart of a process for preserving data integrity during storage controller failure, in accordance with certain embodiments of the present disclosure.

FIG. 6 shows a flowchart of a process for preserving data integrity during storage controller failure, generally designated 600, in accordance with certain embodiments of the present disclosure. The process 600 can be performed by the hardware described herein, such as systems 100, 200, 300, or 400, and can be used in conjunction with the other processes described herein, such as process 500 or 700. The process 600 can be implemented via firmware on a storage controller.

The process 600 can include determining a storage controller failure of at least one of the storage controllers of an active-active storage controller system, at 602. This can be done via any method that allows a storage controller to detect another storage controller has failed (e.g., unresponsive, defective communications, loss of power indicated, etc.). Detection of such may include determining a loss of a communication ability over a communication link to the non-responsive storage controller, which in some examples may be due to a power failure. In some embodiments, controller failure can be indicated by one or both of the following conditions: (1) the PCIe link between the controllers is detected as being down (e.g., communication ability is not present); (2) a PCIe link recovery is attempted, and if not successful, the partner controller is assumed to be down. When both controllers are powered on and operating, they can exchange heartbeat signals (e.g., a periodic signal generated by hardware or software to indicate normal operation or to synchronize functions) using a hardware communication link (e.g., the PCIe BR link) that can connect CPLDs on each controller board through a midplane or a backplane. If such a heartbeat is not received from one of the controllers, that controller is assumed to be down (e.g., non-operational). In both cases, the controller that is assumed to be down can be put into a reset mode to prevent it from coming back up without a step-by-step recovery process.

When a storage controller failure has been detected, the surviving data storage controller can switch to a single controller mode, at 604, which can take over the failed controller's cache using the processes mentioned herein and initiate a cache reconstruction process to recreate the write cache of the failed storage controller. If the data in the cache was not written out before a storage controller failed, it is important to reconstruct the exact write cache state of the failed storage controller. The cache reconstruction ensures that the data of the write cache can be written out to the persistent data storage in the correct order. The firmware of the surviving storage controller can reconstruct the cache of the controller that failed in a single controller mode (or on the partner controller in an active-active configuration), when it takes over the failed storage controller's cache (e.g., by processing all operation requests that are intended for logical locations previously assigned to the failed storage controller). Because of the nature of write operations, such as discussed herein, duplicate data can exist in the cache of the failed storage controller for an LBA range, as that LBA range has not be stored to persistent data storage. Thus, during a controller failure, the surviving storage controller or the failed storage controller (e.g., after a reboot or when a failover operation is triggered) can reconstruct the correct state of the lost cache to preserve the correct write order of operations within the cache. Thus, in some implementations, the processes described herein (e.g., process 500, 600, or 700) can be implemented on the failed storage controller itself if such storage controller can be recovered and rebooted.

The surviving controller does not necessarily need to reboot to perform a cache reconstruction process as described herein. In some embodiments, the surviving controller can continue to operate and perform a failover operation. In this situation, for example, the cache reconstruction process can be triggered by any one of the following: (1) if only one controller fails, the surviving controller can perform a failover operation, which includes the cache reconstruction process, after the failure is detected; and (2) if there is a power failure or power cycling and on a subsequent reboot only one of the controllers comes back online (e.g., communication link(s) cannot detect the other controller), the surviving controller can perform a failover operation.

The process 600 can then implement a data reconstruction process for the cache of the failed storage controller, at 606. Since the data (NVCEs and host data) are mirrored to the surviving controller, the host data available on the surviving storage controller allows it to build the partner storage controller's view of its cache to perform a data merge and preserve the data integrity.

Rebuilding the cache state can include accessing and organizing all of the CEs in the failed cache based on the NVCEs that were backed up to the backup storage controller. This can include selecting an LBA range with corresponding data in the write cache, at 608, and for that selected LBA range, finding all CEs that are marked as dirty, at 610, by checking the dirty bit(s) set in the corresponding NVCE. The selected LBA range may be selected based on a range of LBAs that is associated with a write operation from a host.

The selected CEs that are marked as dirty may be arranged based on their relative timestamps (e.g. as indicated in each corresponding NVCE), at 612. In some embodiments, the selected CEs may be arranged by placing the oldest CE as a base CE and the newer duplicates arranged in an increasing order of their timestamp. Then, the CE with the highest timestamp value is the newest CE that was written to the failed controller by the host.

The process 600 may then determine whether the newest CE has all dirty bits set, at 614. When the newest CE has all the dirty bits set (e.g. each bit, which correspond to a block of data of the CE, indicates that every block of the CE is dirty), then a merge is not required and the process 600 may utilize the newest CE for the selected LBA range. When the newest CE has all the dirty bits set, this indicates that the newest CE was completely written to by the host; thus, any older CEs that might be in the cache from the host are not needed as they would have been fully overwritten by the newest CE.

For example, referring to FIG. 4, the $2^{nd}$ NVCE shown has a dirty mask (DM) having all the dirty bits set to indicate all the blocks of data represented by the CE have been written per the associated operation. This allows the process 600 to stop searching the cache as a merge is not needed or unnecessary. Thus, the $7^{th}$ NVCE, which is older per the timestamp (TS), does not need to be considered even though it corresponds to a write operation for the same LBA range.

When the newest CE does not have all dirty bits set, at 614, the process 600 may then determine if any duplicate CEs exist, at 620. If there are no duplicate CEs, such that there are no more CEs in the backed up cache that correspond to the selected LBA range, the merge is not needed and the newest CE is utilized, at 616. For example, referring to FIG. 4, the $3^{rd}$ NVCE indicates that it corresponds to LBA range 0880 (the LBA range indicators of FIG. 4 are not representative of how a LBA range data is typically stored but are used for ease of illustration) and no other NVCE corresponds to the same LBA range, thus a merge is unnecessary for the $3^{rd}$ NVCE with the other example NVCEs shown in FIG. 4.

When there are one or more duplicate CEs, at 620, the process 600 can perform a merge of the selected duplicate CE(s) and the newest CE (e.g. the merge operation 700 shown in FIG. 7), at 624. The resulting merged CE may then be utilized as the reconstructed CE for the selected LBA range, at 626.

Once a newest CE or merged CE is determined to be utilized for a corresponding CE, the process 600 can then determine if there are more CEs marked as dirty, at 618, and if there is, repeat the process back to selecting an LBA range to determine corresponding CEs in the cache, at 608. If there are no more CEs marked as dirty, the process 600 may determine that reconstruction of the failed cache is complete, at 622.

The reconstructed cache can then be managed via the surviving storage controller (or in some instances by the reset failed controller), at 628. If the failed storage controller does not come back online in a state capable of resuming its operational capabilities to manage the cache operations, the system may permanently assign the logical units the failed storage controller was managing operations for to the surviving storage controller, or until another storage controller replaces the failed storage controller.

This multi-stage approach, creating NVCEs with relative time stamps and utilizing the time stamps for cache reconstruction, solves the problem of resolving the duplicate copies of user data on the surviving storage controller by constructing the correct state of partner's cache and making the write process immune to controller failures while preserving the user data integrity. The processes discussed herein also work seamlessly for lockless write cache based atomic writes also. The systems, processes, and functions described herein are also scalable to multiple controller configurations with greater than two storage controllers; and the two storage controllers configurations discussed herein are not limiting and have been provided to give examples and illustrate the systems, processes, and functions hereof.

Figure 7:
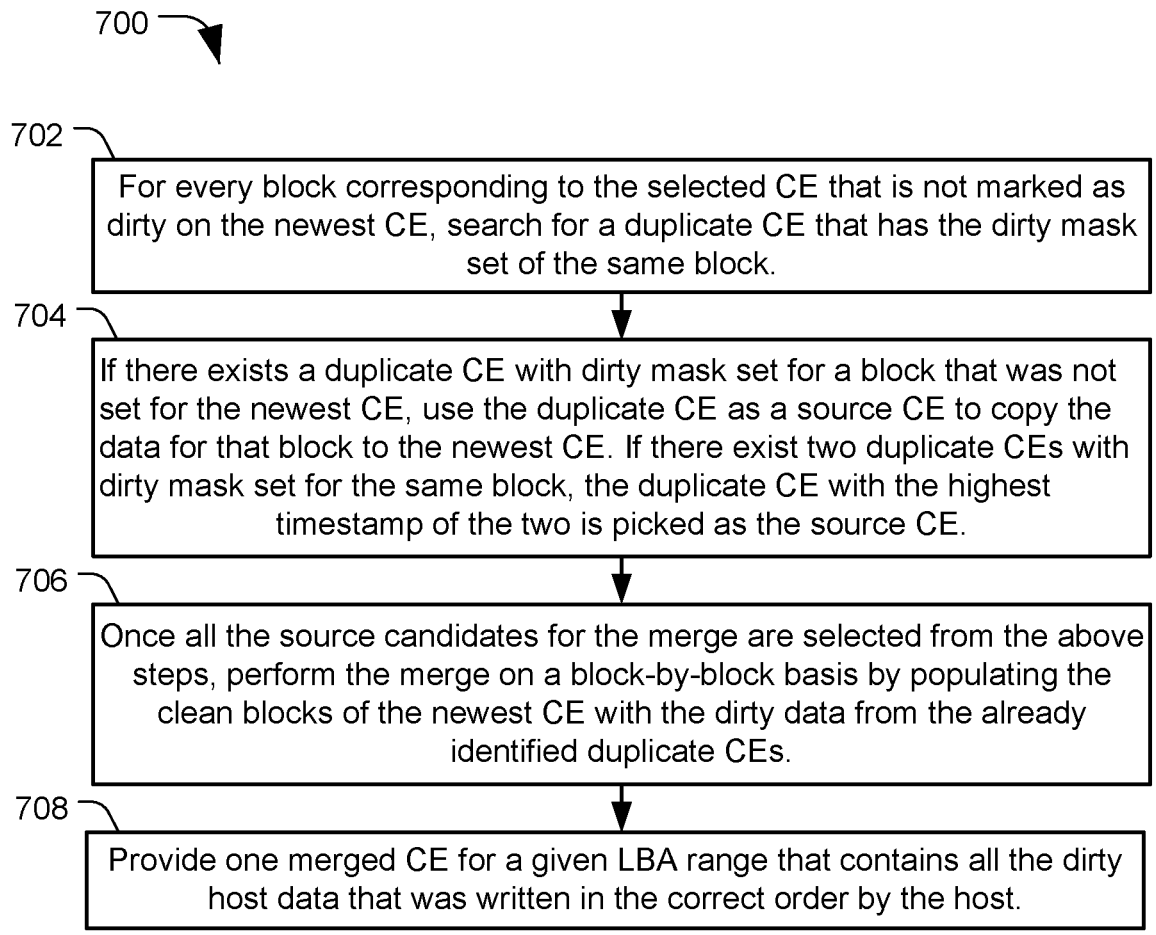
FIG. 7 is a flowchart of a process for preserving data integrity during storage controller failure, in accordance with certain embodiments of the present disclosure.

FIG. 7 shows a flowchart of a process for preserving data integrity during storage controller failure, generally designated 700, in accordance with certain embodiments of the present disclosure. The process 700 can be performed by the hardware described herein, such as systems 100, 200, 300, or 400, and can be used in conjunction with the other processes described herein, such as process 500 or 600. The process 700 is an example data merge process that can be utilized in process 600 to perform the data merge at 624. The process 700 can be implemented via firmware on a storage controller.

The process 700 can perform a data merge of selected CEs by searching for a duplicate CE if the newest CE has partial dirty bits set, at 702. Having only partial (less than all) dirty bits set indicates that the newest CE, or other duplicate CEs, are only a partial overwriting of the LBAs associated with that CE and that older duplicates could possibly contain data that is indicated as dirty in older CEs but not in newer CEs. When such occurs, the data from the older CEs needs to be merged with the newer CE to create a fully updated CE based on the cache state at the time of the failure. Thus, the search process 700 can determine if there are duplicates present (including the base CE) for every block of the selected CE that is not marked as dirty on the newest CE, at 702. The search for a duplicate CE that has the dirty mask set can be done via a dirty bit mask with a bit, representing a dirty state, for each block of the CE.

In some embodiments, if there exists a duplicate CE with a bit of a dirty mask set for a block that was not set for the newest CE, the merge process, at 704, can use the duplicate CE as a source CE to copy the data corresponding to that block to the newest CE. If there exist two or more duplicate CEs with a bit of a dirty mask set for the same block, the duplicate CE with the highest timestamp is picked as the source CE, at 704. Thus, the search can follow the same order as that of the time stamp; the duplicate CEs can be selected based on the decreasing order of their time stamp.

Once all the source CE candidates for the merge are selected from the above steps, the merge can be performed on a block-by-block basis; thus, populating the clean blocks of the newest CE with the dirty blocks from the already identified duplicate CEs, at 706. The process 700 can then provide one merged CE for a given LBA range that contains all the dirty host data in the correct order as written by the host, at 708. The process 700 can generate a new time stamp for the merged CE that can be equal to the sum of the newest CE's time stamp and one, at 708. In some embodiments, this increment by one can ensure no other CEs will have the same timestamp as the one being created by the merge process since the increment is small enough to preserve the atomicity of the timestamp and large enough to preserve the uniqueness of the timestamp as compared to other CEs.

For an example of the merge process, referring to FIG. 4, the 1$^{st}$ NVCE shown has a dirty mask (DM) having less than all the dirty bits set to indicate the blocks of data represented by the CE that have been written per the associated operation. The process 700 can then search for duplicates for the same blocks of data by searching for a same LBA range (e.g., LBA range 1024), at 702. The duplicate search would identify the 4$^{th}$, 5$^{th}$, 6$^{th}$, and 9$^{th}$ NVCEs and corresponding CEs as being duplicates of the 1$^{st}$ NVCE and CE. The process 700 would then proceed to merge the data from the duplicate CEs, at 704 and 706, resulting in a new merged cache element having a dirty mask of 01111111 which can be provided as an output of the merge process and set to have a newest relative timestamp (e.g., TS: 0122), at 708. Note that, in some embodiments, a merged CE's timestamp needs to be updated to current storage controller time or such timestamp plus one (+1) during the process 500, that is, during a data merge process that happens after the host has sent data for the write operation. Updating the CE's timestamp plus one is not absolutely required while reconstructing CEs based on the NVCEs after a failure (e.g. during processes 600 and 700).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing this disclosure. Other embodiments may be utilized and derived from this disclosure, such that structural and logical substitutions and changes may be made without departing from the scope of this disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments and elements can be made, and other embodiments not specifically described herein will be apparent to those of skill in the art upon reviewing the description. For example, while the details discussed above refer to an active-active controller configuration, the systems and processes disclosed herein could be applied to other types of controller configurations. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A server computer system comprising:
a first storage controller configured to connect to a backplane or midplane;
a second storage controller configured to connect to the backplane or midplane;
the first storage controller and the second storage controller configured to operate in an active-active controller configuration where both storage controllers are actively available to support data write operations from a host;
the first storage controller configured to:
mirror first data corresponding to a first write operation intended for a second storage controller into a first memory, the mirrored first data including a first nonvolatile cache element corresponding to payload data of the first write operation, the first nonvolatile cache element including a first relative timestamp based on an order the second storage controller received the first write operation from a host;
when the second storage controller fails:
recreate a state of the second storage controller's write cache based on the first nonvolatile cache element and the first relative timestamp;
merge the mirrored first data on a block-by-block basis with data corresponding to multiple write operations received by the second storage controller, which have overlapping first write locations, based on the first relative timestamp to produce a first new cache element that indicates selected data from more than one of the multiple write operations received by the second storage controller to be written to the first write locations;
write data blocks identified in the first new cache element to the first write locations;
the second storage controller configured to:
mirror second data corresponding to a second write operation intended for the first storage controller into a second memory, the mirrored second data including a second nonvolatile cache element corresponding to payload data of the second write operation, the second nonvolatile cache element including a second relative timestamp based on an order the first storage controller received the second write operation from a host;
when the first storage controller fails:
recreate a state of the first storage controller's write cache based on the second nonvolatile cache element and the second relative timestamp;
merge the mirrored second data on a block-by-block basis with data corresponding to multiple write operations received by the first storage controller, which have overlapping second write locations, based on corresponding relative timestamps to produce a new cache element that indicates selected data from more than one of the multiple write operations to be written to the second write locations; and
write data blocks identified in the new cache element to the second write locations.

2. The server computer system of claim 1 further comprising:
the first storage controller including a first interface configured to receive data write operations, a first CPU, a first volatile memory space, and a first nonvolatile memory space configured to store the first nonvolatile cache element; and
the second storage controller including a second interface to receive a data write operations, a second CPU, a second volatile memory space, and a second nonvolatile memory space configured to store the second nonvolatile cache element.

3. The server computer system of claim 2 further comprising:
the second storage controller configured to:
create a first volatile cache element including a number of data fields to indicate metadata corresponding to the first write operation;

create the first nonvolatile cache element using a subset of the data fields from the first volatile cache element; and
transmit an update to the first nonvolatile cache element to the first storage controller.

4. The server computer system of claim 3 further comprising:
the first storage controller configured to:
create a second volatile cache element including a number of data fields to indicate metadata corresponding to the second write operation, the data fields including at least a relative time stamp field, a dirty mask field, and an address field;
create the second nonvolatile cache element using a subset of the data fields from the second volatile cache element; and
transmit an update to the second nonvolatile cache element to the second storage controller.

5. The server computer system of claim 4 further comprising the backplane or midplane includes a Peripheral Component Interconnect Express (PCIe) interface bus configured to communicatively couple the first storage controller and the second storage controller to allow the first nonvolatile cache element and the second nonvolatile cache element to be updated, the backplane or midplane further including a communication bus to communicatively couple the first storage controller and the second storage controller to a data storage array.

6. The server computer system of claim 4 further comprising the first storage controller configured to detect failure of the second storage controller when communication from the second storage controller is not detected.

7. The server computer system of claim 4 further comprising the first storage controller configured to determine when a merge is unnecessary when a dirty mask stored as one of the data fields in the second nonvolatile cache element has all bits therein set to indicate that all data blocks associated with the corresponding cache element are to be written via a corresponding write operation.

8. The server computer system of claim 4 further comprising the first storage controller configured to determine when duplicate cache elements exist based on a logical block address (LBA) range stored in the address field of the second nonvolatile cache element, and when duplicate cache elements do not exist, determine a merge process does not need to be executed.

9. The server computer system of claim 8 further comprising the first storage controller configured to:
arrange all backup cache elements pertaining to a specific LBA range in a relative time order based on a relative time stamp field of each;
perform a merge operation on the backup cache elements to produce a new set of blocks containing data not yet stored to persistent storage, the merge operation including:
when a newest backup cache element has partial dirty bits set and there is a duplicate backup cache element present, for every block of the newest backup cache element that is marked as a clean block, select a duplicate backup cache element that has a dirty indicator set for the clean block;
when there exist duplicate backup cache elements with a dirty indicator set for the same block, select the duplicate cache element with a newest timestamp as a source to be merged;
merge the selected dirty blocks from the duplicate backup cache elements to replace the clean blocks of the newest backup cache element to generate an updated cache element; and
provide the updated cache element to the write cache for later storage of corresponding data blocks to persistent storage.

10. An apparatus comprising:
a first storage controller subsystem configured to operate in an active-active controller configuration with a second storage controller subsystem and manage host data write operations, the first storage controller subsystem including:
a first interface configured to connect to a backplane or midplane and configured to receive the host data write operations;
a first memory;
a first memory controller configured to:
mirror data corresponding to a host write operation intended for the second storage controller subsystem into the first memory, the mirrored data including a nonvolatile cache element (NVCE) corresponding to the data of the host write operation, the NVCE including a relative timestamp based on an order the second storage controller subsystem received the host write operation corresponding to the mirrored data;
when the second storage controller subsystem fails:
recreate a state of the second storage controller subsystem's write cache based on the NVCE and the relative timestamp;
merge the mirrored data with data corresponding to other write operations received by the second storage controller that have overlapping write locations, perform a merge process on a block-by-block basis based on the relative timestamp, produce a new cache element indicating the data to be written to the write locations as an output of the merge process; and
write data blocks corresponding to the new cache element to the write locations based on the new cache element.

11. The apparatus of claim 10 further comprising:
the second storage controller subsystem communicatively coupled, via the backplane or midplane, to the first storage controller subsystem to operate in the active-active controller configuration, the second storage controller subsystem including:
a second interface configured to connect to the backplane or midplane and configured to receive the host data write operations;
a second memory; and
a second memory controller configured to mirror data corresponding to host write operations intended for the first storage controller subsystem into the second memory.

12. The apparatus of claim 10 further comprising the first memory controller configured to:
store a cache element (CE) in the first memory, the CE corresponding to specific data received via the host data write operations, each CE including one or more data fields indicating a state of data corresponding to the CE; and
store the NVCE in a nonvolatile memory, the NVCE corresponding to a specific CE and containing a subset of data fields from the specific CE.

13. The apparatus of claim 12 further comprising the NVCE includes a timestamp field to indicate when that NVCE was last updated in response to a data transfer from a host or a data merge operation from another CE.

14. The apparatus of claim 12 further comprising the NVCE includes a data hardened flag field to indicate when the first storage controller subsystem has completely received corresponding data from a host.

15. The apparatus of claim 12 further comprising the NVCE includes an input-output identifier (IOID) field to identify a specific host write operation that a CE is associated with.

16. The apparatus of claim 12 further comprising the NVCE includes a dirty mask field to indicate when associated host data has not yet been stored to persistent storage.

17. The apparatus of claim 12 further comprising the CE includes a valid mask field to indicate whether a data block corresponding to a CE contains valid data.

18. A method comprising:
operating a first storage controller subsystem in an active-active controller configuration with a second storage controller subsystem to manage host data write requests to a data storage server;
performing, at the first storage controller subsystem, relative time stamp dating of data received from a host and stored in a write cache to maintain a logical write order while executing write operations;
mirroring backup data, at the first storage controller subsystem, corresponding to host writes intended for the second storage controller subsystem into the write cache, the backup data including a cache element including information to allow the first storage controller subsystem to determine which data is newest on a block-by-block basis based on a relative time stamp of the cache element;
determining a failure condition of the second storage controller subsystem; and
when the failure condition is determined, reconstructing the second storage controller subsystem's write cache via the backup data by selecting the backup data on a block-by-block basis based on the relative time stamp of the cache element.

19. The method of claim 18 further comprising:
storing cache elements (CE) in the write cache, each CE corresponding to specific data received via the host data write requests, each CE including multiple data fields indicating a state of data corresponding to that CE, the multiple data fields including a relative time stamp field;
mirroring the backup data includes storing nonvolatile cache elements (NVCE) in a nonvolatile memory, each NVCE corresponding to a specific CE and containing a subset of data fields, from the specific CE, including the relative time stamp field; and
reconstructing the backup data includes reconstructing corresponding CEs from the NVCEs.

20. The method of claim 19 further comprising:
arranging multiple backup CEs in a relative time order based on the relative time stamp of each of the backup CEs;
performing a merge operation on the backup CEs to produce a new set of blocks containing data not yet stored to persistent storage, the merge operation including:
determining if any duplicates are present in the backup CEs;
when a newest backup CE has partial dirty bits set and if there is a duplicate backup CE present, for every block of the newest backup CE that is marked as a clean block, selecting a duplicate backup CE that has a dirty indicator set for the clean block;
if there exist duplicate backup CEs with a dirty indicator set for the clean block, the duplicate CE with a newest timestamp is selected as a source to be merged for the clean block;
merging a selected dirty block from a selected duplicate backup CE to replace the clean block of the newest backup CE, the merging resulting in a new backup cache element indicating a combination of dirty blocks from duplicate CEs; and
providing the new backup cache element to a write cache for later storage of the corresponding data blocks to persistent storage.

* * * * *